May 30, 1944.                H. P. BACON                    2,349,841
                         APPARATUS FOR COOLING GAS
                         Filed July 1, 1942         2 Sheets-Sheet 1
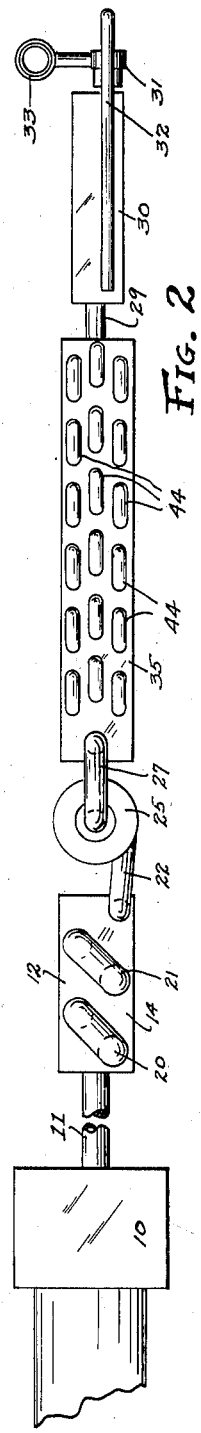
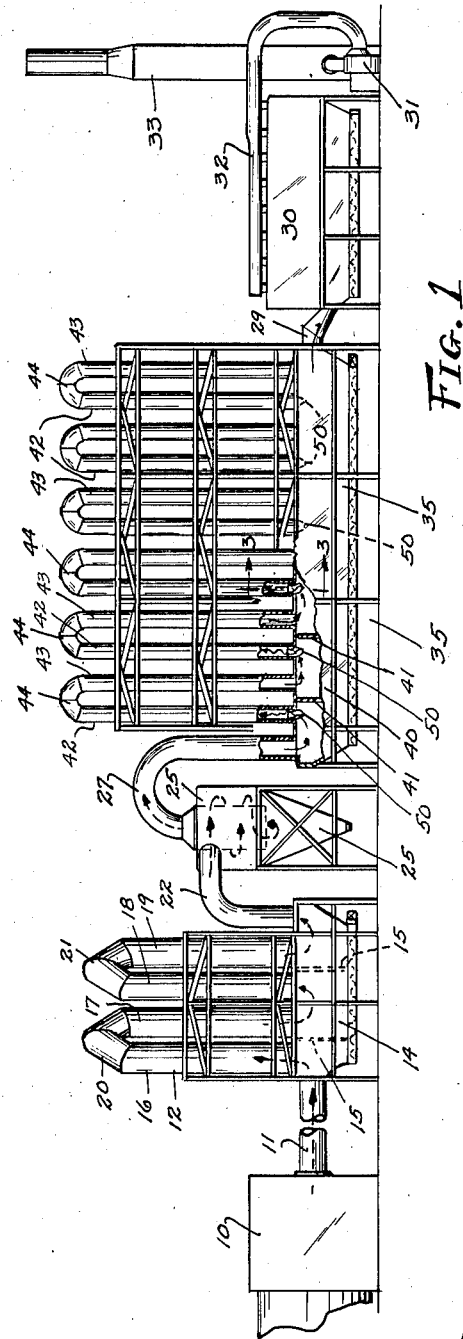
INVENTOR.
HOLLIS P. BACON
BY
Bates Teare & McBean
ATTORNEYS

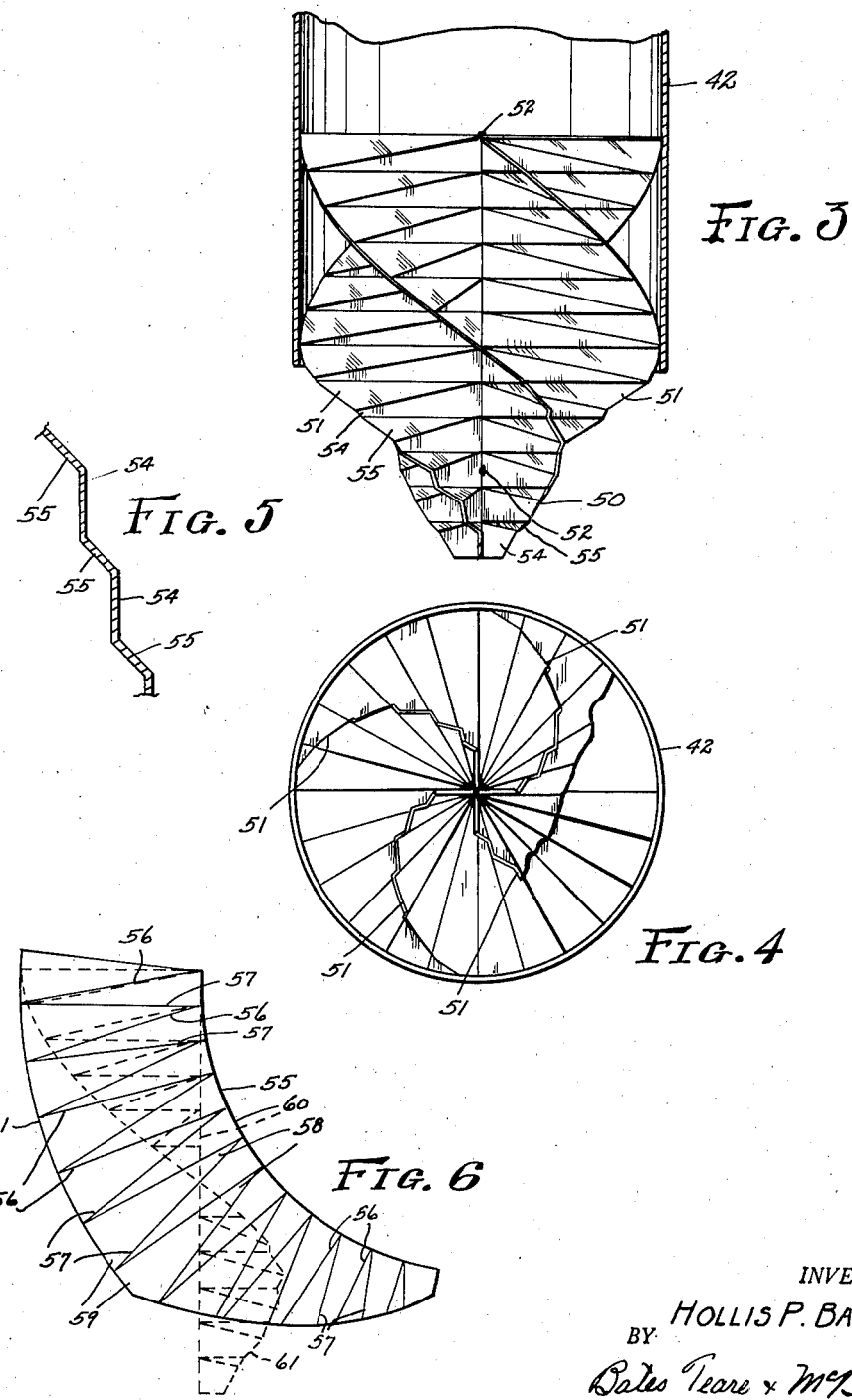

Patented May 30, 1944

2,349,841

UNITED STATES PATENT OFFICE 2,349,841

APPARATUS FOR COOLING GAS

Hollis P. Bacon, Cleveland, Ohio, assignor to Northern Blower Company, Cleveland, Ohio, a corporation of Ohio Application July 1, 1942, Serial No. 449,238

2 Claims. (Cl. 138—38)

This invention relates to a method and apparatus for cooling gases, and particularly to an improved method and apparatus that may be utilized to cool hot dust laden gases, such as for instance those exhausted from furnaces or rotary kilns.

This invention is specially adapted for use in connection with the manufacture of metal oxides, such as the oxides of copper, lead, zinc, or the like. Such oxides are generally manufactured by roasting or subjecting metallic ores to a comparatively high temperature in a furnace or rotary kiln. The hot gases containing the oxides are drawn from the furnace and the oxides are extracted by a filtering unit. These gases leave the furnaces at a comparatively high temperature which in the case of lead oxide is approximately 1600° F. This temperature is far too high for efficient operation of the devices used to filter the oxides from the gas. For instance, it has been found that the temperature of the gases must be reduced to a temperature not to exceed 200° F. when the usual bag type filtering device is employed.

To accomplish this cooling, the gases have been passed through a series of conduits made of a heat conducting material, the heat passing from the stream of gas to the walls of the conduit which in turn have been cooled by simple radiation. However, considerable difficulty has been encountered in attempting to deliver the gas to the filter unit at a temperature below a predetermined maximum. This has been caused by varying atmospheric conditions which affected the radiation of heat from the conduits. The temperature of the gas delivered to the filter has varied because of the impingement of the sun and elements against the conduit, or the building within which they are housed, as well as the velocity, humidity, and temperature of air passing in and around the conduits, all of which alter the radiation effect of the conduits. To insure the reduction in temperature in the conduit under various atmospheric conditions, it has been customary in the past to use a great number of conduits or passages. This, however, has required an objectionable amount of power for the operation of the mechanism which moved the gas through the system. Therefore, in many instances, a balance has been sought between efficiency of the filtering unit, as determined by the temperature of the gas entering the same, and the power required to operate the system. In an effort to effect a sufficiently great reduction in the temperature of the gas to enable efficient operation of the filtering device without using a prohibitive amount of radiation conduit, it has been customary to bleed air at atmospheric temperatures into the system, between the roaster and the filter. Obviously, while this permits a reduction in the number of passages or in the length of the cooling conduit, it increases the volume of gas to be handled by the filter and does not decrease the power required to move the gas through the system. Indeed, in some instances, the power required has been increased.

It is, therefore, an object of the present invention to provide a method and apparatus for cooling the gases prior to their delivery to a filter mechanism, which will not only insure a sufficient reduction in temperature of the gas to permit efficient operation of the filter without bleeding air into the system, but which will require a minimum length of cooling conduit and a minimum amount of power to maintain a continuous passage of the gas through the system.

It has been discovered that one of the contributing factors of the transfer of heat during the passage of the gas through the cooling conduits is the dynamic condition of the gas in the conduits. For example, if the gas is permitted to flow through a conduit in a normal or what might be termed a quiescent state, the heat transfer is perceptibly smaller than it is if the gas is caused to flow through the conduit in a turbulent condition. I believe that whenever the gas flows through a conduit in a quiescent or relatively uni-directional path, a film of relatively stagnant gas covers the inner surface of the conduit and acts as an insulator against the conductivity of heat.

Accordingly, an object of the present invention is to utilize the foregoing discovery to break the insulating film and thereby to increase greatly the efficiency of heat transfer. This has been accomplished by providing a device which will break up the air currents as they enter the conduit and impart to them a turbulent motion, as for instance, a spirally or whirling motion. By utilizing a plurality of conduits through which the gas passes serially and installing such a device at the entrance point to each of the conduits, a considerably greater amount of heat will be extracted from the gases than when such devices are not used.

As a result of the marked increase in heat transfer, I have found that considerable reduction may be made in the size of the cooling equipment, as well as in the power required for causing the gas to move continuously through the system. Accordingly, another object of the invention is to provide an improved cooling system which will include means to break up the air currents as they enter the conduit and thereby prevent the movement of the gas through the conduit in a quiescent state.

Other objects of this invention will become more apparent from the following description, reference being had to a preferred form of apparatus for carrying out the invention, as illustrated in the accompanying drawings. The essential and novel features of the invention will be summarized in the claims.

In the drawings, Fig. 1 is a diagrammatic view, in side elevation of my improved cooling system as adapted for use in connection with the manufacture of a metallic oxide, certain portions of the mechanism being broken away to more clearly illustrate the internal construction; Fig. 2 is a plan view of the mechanism illustrated in Fig. 1; Fig. 3 is a sectional detail on an enlarged scale of a device utilized for breaking up the stream of gas as it enters the cooling tube, the plane of the section being indicated by the lines 3—3 in Fig. 1; Fig. 4 is a bottom view of the device shown in Fig. 3; Fig. 5 is a sectional detail as indicated by the lines 5—5 on Fig. 3, and Fig. 6 is a diagrammatic view illustrating a portion of the device of Figs. 4 and 5 prior to forming of the device.

Referring now to the drawings, and particularly to Figs. 1 and 2, it will be seen that I have illustrated my improved method and apparatus for cooling gases in connection with a metallic oxide manufacturing system. Such system includes a furnace or kiln 10 in which the ores are roasted, giving off hot gases which carry the oxides away from the furnace. These gases pass through a large horizontal trail or conduit 11 to a precooling unit 12. This unit comprises a horizontally extending casing 14 provided with vertically extending partitions 15 which divide the casing into two hopper sections. The gases enter the left hand hopper section of the casing 14 as shown in Fig. 1, pass upwardly into a cooling tube 16 and thence downwardly through a similar tube 17 into the central hopper section, thence upwardly through another vertical tube 18, and downwardly through a similar tube 19 into the right hand hopper section which forms the discharge end of the casing 14. The tubes 16 and 17, as well as the tubes 18 and 19 are joined together in pairs at their upper ends by return bends 20 and 21. While passing through these vertical cooling tubes, the temperature of the gas is reduced from approximately 1600° F. to a temperature of about 1000° F. From the discharge end of the casing 14, the hot gas passes through a duct 22 into a dust collector, generally indicated at 25.

The dust collector is preferably of a type that is partly cyclonic in action so that all heavy undesirable particles that may be carried from the furnace or kiln and which may consist of free metal, undesirable oxide, such as iron and the like, as well as particles of waste products, are thrown to the side and dropped to the bottom of the collector where they may be removed at stated intervals.

The hot gases, including the desirable oxides, pass from the dust collector through a conduit 27 into the main cooling unit 35, which is interposed between the dust collector 25 and a filtering unit 30. As will be noted, a suction type blower unit 31 is connected by a conduit 32 with the exhaust side of the filtering unit and serves to move the gas continuously through the entire system, ejecting the residual gases to atmosphere through a suitable stack, such as indicated in the drawings at 33.

The cooling unit 35 with which this invention is particularly concerned, comprises as shown in Fig. 1, an elongated horizontally extending passage or housing 40 which is divided by transversely extending vertical partitions 41 which divide the housing into a series of compartments or hopper sections. Arising from each of these compartments are a plurality of vertically extending radiation or cooling tubes 42 and 43, the former providing intakes and the latter exhausts for their respective compartments. The intake tubes of each compartment of the housing 40 is connected to an exhaust tube of the preceding housing by a return bend, such as indicated at 44.

The vertically extending tubes or conduits 43 and 42 are formed of heat conductive material, such as a metal which will absorb the heat from the gas and radiate it to the air circulating about the exterior of the tube. The height and number of these tubes depends, of course, upon the reduction in heat required and the efficiency in operation of the tube. Now it has been found, as heretofore mentioned, that the efficiency of the transfer of heat by these tubes is greatly increased if the gases are caused to flow therethrough in a turbulent condition. This is particularly true when the gases are laden with dust, such as oxides. If the gases are merely drawn through these tubes by the action of the blower, a film or layer of quiescent gas accumulates adjacent the inner wall of the tube. This layer moves very slowly and forms practically a stagnant or static layer covering the entire internal surface of the cooling system, and forming an effective barrier to the transfer of heat from the column of moving gas in the tube to the surface of the tube itself, thus materially decreasing the heat conductivity of the unit. Furthermore, when the gas is laden with comparatively lightweight dust, such as an oxide, a portion of this dust has a tendency to accumulate on the internal surface of the tube, thus adding to the insulation effect of the quiescent gas layer and further decreasing the efficiency. I have found that this insulating layer of gas adjacent the inner surface of the tube may be eliminated and the accumulation of dust on the tube wall prevented by breaking up the gas currents as they enter the tube and by imparting a turbulent motion, such as a spiral or whirling motion to the gas.

The turbulent action of the gas is caused by a device generally indicated at 50 in Fig. 1 at the bottom of each tube 42. This device is shown in detail in Figs. 3 to 6 inclusive, and comprises a plurality of plate-like members 51 which are inserted in the lower portion of the tube. These members are joined at and spiral upwardly about the axis of the tube. In the drawings, the plates are so arranged as to form four spirals. However, the number of spirals required depends upon the diameter of the tube, the gravity of the gas to be cooled and the amount of dust or oxide in the tube.

In the drawings, the spirals 51 project downwardly from the bottom of the tube and into the path of the gas as it moves through the horizontal casing 40. Thus, the column of moving gas is broken up prior to its entrance in the tube. Furthermore, I have found that by bringing the spiraling plates to a point at the bottom unit with their external edge surfaces in effect touching the walls of a theoretical inverted cone, the efficiency of the unit is greatly increased. These spiral plates are formed of a series of flat triangular flights, the adjacent flights being bent at an angle to each other. By so forming the spiral, the surface continuity of the plates is repeatedly broken, thus imparting to the gas a highly turbulent action in addition to a whirling action. This action is further increased by the fact that the gas flowing substantially in a horizontal direction in the hopper or casing section 40 strikes the projecting portion of the device substantially at right angles to the axis of the device which combined with the conical form of the projecting portion acts to break up the stream of gas and create an extremely turbulent condition. The turbulent condition of the gas entering the tube eliminates the insulating layer of quiescent gas heretofore mentioned, maintains the oxides in suspension in the gas and prevents the accumulation of such oxides on the tube walls, thereby increasing not only the flow of the gas through the tube, but also the rate of heat conductivity of the tube. The result of utilizing such devices at the entrance point of each tube has been found to be highly beneficial in that it has increased the B. t. u. transfer per foot of cooling surface from .86 B. t. u. to 1.86 B. t. u. per square foot of surface for each degree in difference of temperature. As a result of this great difference in heat transfer, the invention makes it possible to make a considerable reduction in the size of the equipment and in the power required for moving the air in the system. Furthermore, it insures delivery of the air to the bag filtering device 30 at the most efficient temperature for the operation of the filter.

The spiral device, shown in Figs. 3 and 4 comprises four individual plate-like members 51 which are welded together vertically along the axis of the tube, as indicated at 52. Each of these members is formed of a flat plate, the shape of which is indicated by the outline 55 in Fig. 6. The plate is formed into a spiral by placing it in a bending brake and bending it first downwardly and thence upwardly as indicated by the lines 56 and 57 on Fig. 6. These lines form sets of triangles, one set 58 having their vertices at one edge of the plate and the other set 59 having their vertices at the opposite edge of the plate. Thus, when completely formed, one edge of the plate becomes a substantially straight line 60 which extends along the axis of the tube, while the other edge of the plate comprises a spiral indicated at 61 composed of a series of chords formed by the bases of one set of triangles. This edge of the plate abuts the external surface of the tube. When completely formed, each plate comprises as indicated in Fig. 6, a series of triangular vertically extending risers 54 connected together by a series of inclined treads 55, thereby providing a series of angularly disposed gas deflecting surfaces.

The specific form and construction of the plate forming the device 50 described and illustrated has been found to be highly efficient. However, it is obvious that variations in form and construction thereof come within the spirit of this invention and modifications thereof may be used with varying degrees of success. For instance, a true spiral may be given to the plates forming the device.

I claim:

1. A device for cooling hot gas, comprising an elongated vertically extending tube, means in the end of said tube to impart a whirling action to gas entering said tube, said means comprising a plurality of bent plate members joined together along the axis of said tube, each member being formed by a series of transversely extending angularly disposed bends so arranged as to form a plurality of adjacent triangular plate portions, the bases of alternate portions being formed by opposite sides of the plate, and the planes of alternate portions extending in a substantially axial direction relative to said tube while the planes of the other triangular plate portions extend at an angle to such axis.

2. In a device for cooling hot gases by radiation having an elongated conduit of heat conducting material in open communication with a source of hot gas supply, a baffle disposed in said conduit and comprising a spirally arranged plate-like member having a portion thereof projecting beyond the end of the conduit into the path of gas moving through said source of supply, whereby a portion of the gas moving through said source of supply is diverted into said conduit and has imparted thereto a spiral motion prior to its entry into said conduit.

HOLLIS P. BACON.